US011265591B2

(12) United States Patent
Kumar (10) Patent No.: US 11,265,591 B2
(45) Date of Patent: Mar. 1, 2022

(54) MANAGEMENT OF VIDEO DATA STORAGE ACROSS MULTIPLE STORAGE LOCATIONS

(71) Applicant: DRAGONFRUIT AI, INC, Menlo Park, CA (US)

(72) Inventor: Amit Kumar, Menlo Park, CA (US)

(73) Assignee: DRAGONFRUIT AI, INC., Menlo Park, CA (US)

( * ) Notice: Subject to any disclaimer, the term of this patent is extended or adjusted under 35 U.S.C. 154(b) by 0 days.

(21) Appl. No.: 16/689,760

(22) Filed: Nov. 20, 2019

(65) Prior Publication Data

US 2021/0152865 A1 May 20, 2021

(51) Int. Cl.
*H04N 21/266* (2011.01)
*H04N 21/218* (2011.01)
*H04N 21/2225* (2011.01)
*H04N 21/2343* (2011.01)
*H04N 21/235* (2011.01)

(52) U.S. Cl.
CPC ....... *H04N 21/266* (2013.01); *H04N 21/2181* (2013.01); *H04N 21/2225* (2013.01); *H04N 21/2353* (2013.01); *H04N 21/23439* (2013.01)

(58) Field of Classification Search
CPC .................................................. H04N 21/266
See application file for complete search history.

(56) References Cited

U.S. PATENT DOCUMENTS

| | | | |
|---|---|---|---|
| 2011/0153687 A1* | 6/2011 | Bacher | G06F 16/22 707/812 |
| 2012/0062732 A1* | 3/2012 | Marman | G08B 13/19682 348/142 |
| 2013/0036135 A1* | 2/2013 | Brockey | G06F 16/51 707/770 |
| 2016/0283106 A1* | 9/2016 | Thorne | H04N 5/23216 |
| 2019/0149793 A1* | 5/2019 | Huang | H04N 9/7921 386/232 |

* cited by examiner

*Primary Examiner* — Michael H Hong (57) ABSTRACT

Systems, methods, and software described herein manage the storage of video data in multiple storage locations. In one example, a system obtains video data from a video source and stores the video data in a first format in a first storage location. Additionally, the system stores the video data in a second format in a second storage location, wherein the second format comprises one or more lesser video quality characteristics than the first format. The system further identifies metadata associated with the video data and stores the metadata in the second storage location.

18 Claims, 7 Drawing Sheets

MANAGEMENT OF VIDEO DATA STORAGE ACROSS MULTIPLE STORAGE LOCATIONS

BACKGROUND

Video data can be generated in a variety of different formats to support various different applications. These different formats may include different resolutions, different frame rates, different color gradients, or some other different formatting. As the video data is generated, the data may be imported to a computing device or devices to support editing, surveillance, or other operations in association with the video data. However, as the formats require increased storage space to accommodate higher quality video, it can become difficult and cumbersome for end users generating the video to store and manage the different video files from the video sources.

In some examples, users, such as individuals or organizations, may further prefer to distribute and/or backup the captured video data by storing at least a portion locally, as well as in a remote computing device or cloud storage provider. However, determining what video should remain local and what video to provide to the remote storage device or provider can be difficult on the user associated with the video data.

Overview

Provided herein are systems, methods, and software for managing video data storage across multiple storage locations. In one implementation, a video management system obtains video data from a video source. The video management system further stores the video data in a first format in a first storage location and stores the video data in a second format in a second storage location, wherein the second format comprises one or more lesser video quality characteristics than the first format.

In some examples, the video management system may further identify metadata for the video data based on one or more characteristics identified in the video data. Once identified, the video management system may store at least a portion of the metadata with the video data in the second format in the second storage location.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Figure 1:
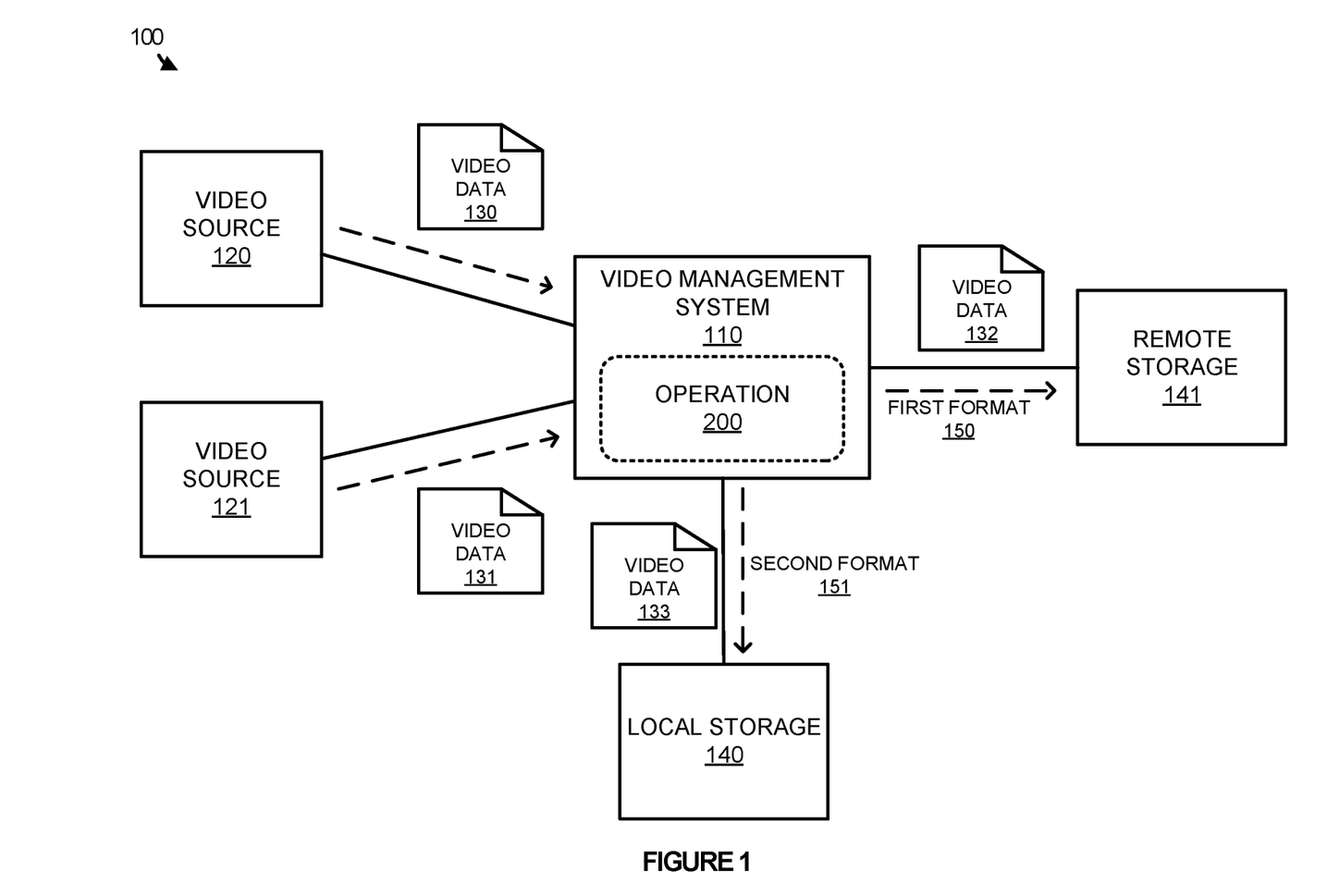
FIG. 1 illustrates a computing environment to manage the storage of video data across multiple storage locations and formats according to an implementation.

FIG. 1 illustrates a computing environment 100 to manage the storage of video data across multiple storage locations and formats according to an implementation. Computing environment 100 includes video sources 120-121, video management system 110, video data 130-133, remote storage 141, local storage 140, first format 150, and second format 151. Video sources 120-121 may comprise cameras, storage devices, such as disk drives, solid state storage, Secure Digital (SD) cards, or some other video source. Local storage 140 may represent a user computer, tablet, server, or some other storage device or devices. Remote storage 141 may represent a server or servers available over the internet, a cloud storage service, or some other remote storage solution. In some examples, remote storage 141 may represent storage that is available over the internet, while local storage 140 may be available over a local network or at a local computing device. In some examples, local storage 140 may represent a storage element that is closer in physical (geographical) proximity to an end user associated with the video data than remote storage 141. Video management system 110 is configured to provide operation 200 that is further described below in FIG. 2.

In operation, video management system 110 ingests video data 130-131 from video sources 120-121 and determines a storage location for the video data. For example, video sources 120-121 may represent SD cards that capture data in a first format, wherein the first format may comprise a particular frame rate, resolution, color accuracy, compression format, or some other format factor. As the data is obtained, video management system 100 may determine how and where the video data is stored in local storage 140 and remote storage 141. In some implementations, video data 132 that is stored as first format 150 may comprise video data that is stored in a higher quality than video data 133 that is stored as second format 151.

As an example, video data 130 from video source 120 may be provided in 4K with a sixty frame per second frame rate. As the data is obtained, video management system 110 may store the full video data as video data 132 in remote storage 141, while a down-sampled or lower quality version is stored in local storage 140. This lower quality version of the original video data may comprise a lower resolution, a lower frame rate, or some other lower quality format than the format that was stored in remote storage 141.

In some examples, video management system 110 may comprise a desktop computing system, a laptop computing system, a tablet computing system, or some other computing system associated with a user of video sources 120-121. For instance, when a user connects a storage device to a local computer, the video data may be processed by the local computer to determine the storage locations and video formats for the video data. Thus, video management system 110 may store the full formatted and highest quality video data in remote storage 141, while storing a lower quality format of the video data in local storage 140. Advantageously, this may permit the user of video management system 110 to preserve storage resources, while maintaining access to a form of the video data. In some implementations, rather than processing the video data locally, the operations of video management system 110 may be implemented at least partially in a remote or cloud computing system. The remote computing system may be coupled to an ingesting system for the video data and obtain the data from the ingesting system.

In some implementations, in addition to determining the quality or format of the video data and the storage location of the video data, video management system 110 may further determine metadata to be stored alongside the video data. For example, in addition to storing video data 133, video management system 110 may identify metadata and store the metadata alongside video data 133. The metadata may be identified based on objects identified in images of the video data, based on time stamps associated with the video data, based on flags set by users viewing the video data, or based on some other characteristic. For example, metadata may place a flag at any portion of video data 133 that a person was detected in the video data, which may flag or put relevance on a portion of the video for an end user reviewing video data 133 from local storage 140.

Figure 2:
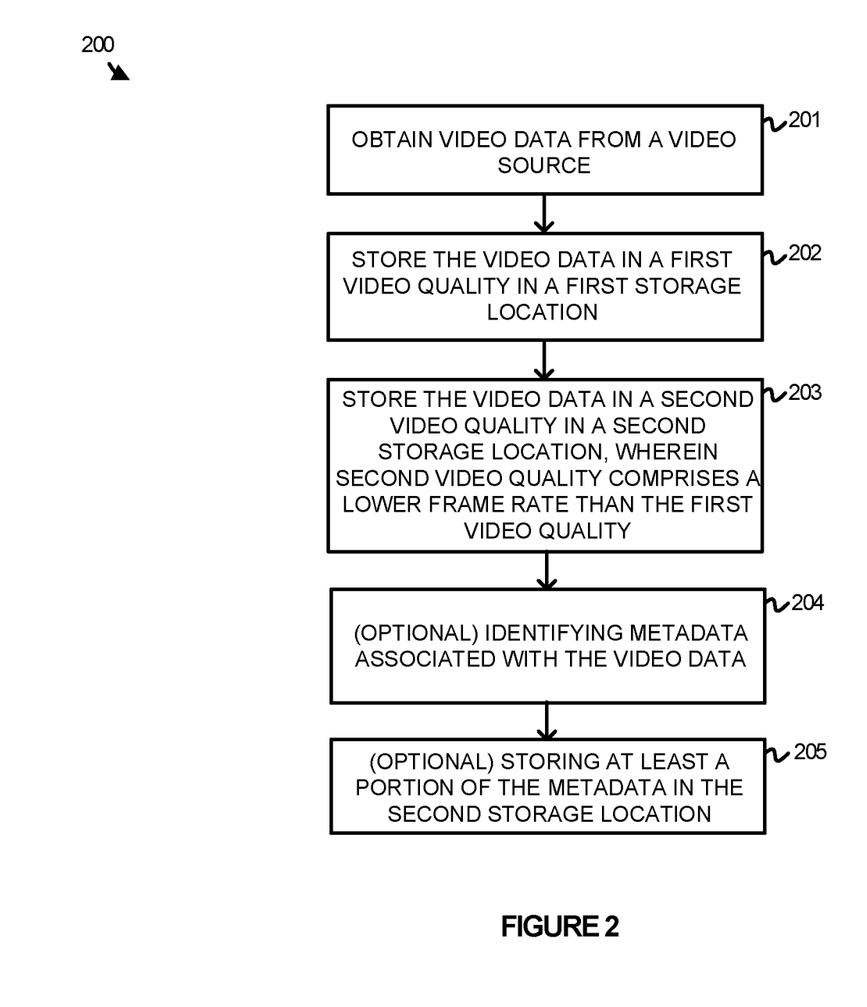
FIG. 2 illustrates an operation of a video management system to manage the storage of video data across multiple storage locations and formats according to an implementation.

FIG. 2 illustrates an operation 200 of a video management system to manage the storage of video data across multiple storage locations and formats according to an implementation. The processes of operation 200 are referenced parenthetically in the paragraphs that follow with reference to systems and elements of computing environment 100 of FIG. 1.

As depicted, operation 200 includes obtaining (201) video data from a video source, wherein the video source may comprise a camera or a storage device, such as a disk drive SD drive, or some other storage device. As the video data is obtained, video management system 110 and operation 200 stores (202) the video data in a first format in a first storage location. In some implementations, the video data that is obtained from the video source may be in the same format as that stored in the first storage location. In other implementations, the video data that is obtained from video source may be in a different format as that stored in the first storage location. For example, video source 120 may provide video data 130 in an 8K format, while video management system 110 may downgrade the format to 4K for storage as video data 132 and first format 150 in remote storage 141.

In addition to storing the video data in the first storage location, video management system 110 stores (203) the video data in a second format in a second storage location, wherein the second format comprises one or more lesser video quality characteristics than the first format. Referring to an example in computing environment 100, as video data 130 is obtained from video source 120, video management system 110 may store the video in two formats for remote storage 141 and local storage 140. To preserve storage space on local storage 140, which may comprise a local computer or server for a user, video management system 110 may store a downgraded version of the video data such that it is reviewable by the end user at a local computing system. Additionally, another version of the video data may be stored in remote storage 141 in another format, wherein the other format may comprise better video quality characteristics than the format stored at local storage 140. The video quality characteristics may comprise resolution frame rate, or color quality associated with the video data. For example, if video data 130 comprised 8K video at a sixty frame per second refresh rate, video management system 110 may down grade the video to a lower resolution and lower frame rate and store the video data in local storage 140. Additionally, the full video quality may be stored in remote storage 141 as video data 132.

In some implementations, a portion of the better video quality data may be cached in the same storage location as the lower quality video data. Returning to the example of lesser video quality data being stored in local storage 140, video management system 110 may cache a portion of the better quality video data to be stored in remote storage 141 in local storage 140, such that the data may more readily be recalled by a user coupled to local storage 140. In particular, if remote storage 141 is available over the internet, the data for local storage 140 (local computer or local network server) may provide the required data to the requesting user when it is available. The cached portion may comprise a most recent time period of ingested video, may comprise a portion with defined metadata traits, or may comprise some other portion of video. In some examples, video data may be stored as a copy in both local storage 140 and remote storage 141. In other examples, video data may be temporarily cached in local storage 140 prior to being migrated to remote storage 141. The migration may occur at periodic intervals, during networking downtime, during video ingestion downtime, or at some other interval.

In some examples, in addition to storing the video data in the second storage location (i.e., local storage 140), video management system 110 may identify (204) metadata for the video data based on one or more characteristics identified in the video data. In some implementations, the metadata may include information about the recording device, the location of the video, the timestamps associated with the video, or some other information associated with the video. In other implementations, the metadata may include characteristics about the images in the video data, wherein the characteristics may include objects of interest identified in the video data, movement in the video data, or some other information for the video data. The characteristics may be identified manually by a user associated with the video data or may be identified using one or more operations capable of processing the video data. Once the metadata is identified, video management system 110 may store (205) at least a portion of the metadata with the video data in the second format in the second storage location. As an example, a process in video management system 110 may process video data 130 to identify when a person enters a frame of video. When a person enters the frame, the process may generate metadata that indicates that a person has entered the frame, wherein the metadata may include a timestamps for the person in the frame of the video, any detected actions of the person in the frame, or some other information about the detected person. Once the metadata is generated in can be stored with the lesser quality video in the second storage location.

Figure 3:
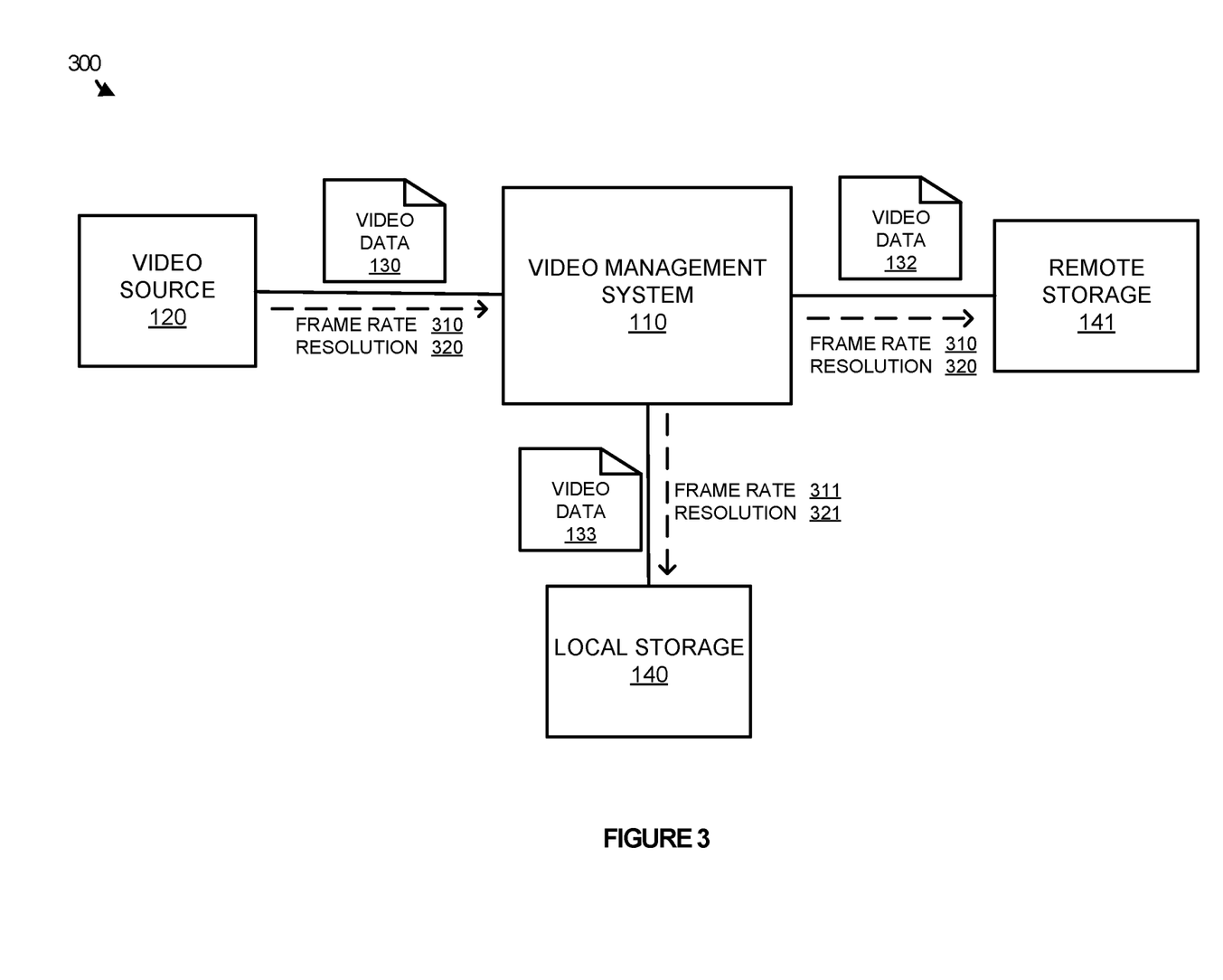
FIG. 3 illustrates an operational scenario of storing video data according to an implementation.

FIG. 3 illustrates an operational scenario 300 of storing video data according to an implementation. Operational scenario 300 includes systems and elements of computing environment 100 of FIG. 1. In particular, operational scenario 300 includes video source 120, video management system 110, storage 140-141, and video data 130 and 132-133 from computing environment 100 of FIG. 1. Operational scenario 300 further includes frame rates 310-311, and resolutions 320-321.

In operation, video management system 110 obtains video data 130 from video source 120, wherein video source 120 may comprise a camera or a video storage device. When video data 130 is obtained, video management system 110 generates video data 132-133 and supplies the video data to local storage 140 and remote storage 141. Here, as the video data 130 is obtained, video management system 110 stores video data 132 in remote storage 141 using the same frame rate 310 and resolution 320 as the original video data. Thus, in some examples, video management system 110 may provide a passthrough, such that the video data is directly stored in remote storage 141. Although demonstrated as storing video data 132 with the same frame rate and resolution as the original video data, video management system 110 may modify characteristics of the video data prior to storing the video data in remote storage 141. These modifications may include modifying the frame rate, modifying the resolution, modifying color attributes, or modifying some other trait associated with the video data.

In addition to storing the video data in remote storage 141 as video data 132, video management system 110 further stores video data 133 in local storage 140. Here, video data 133 represents a downgraded version of video data 132 that is stored in remote storage 141 and includes frame rate 311 and resolution 321. In some examples, video data 133 may comprise a lower resolution, lesser frame rate, a lower quality color configuration, or some other differences from video data 132. In some implementations, by downgrading the video data that is stored locally at local storage 140, storage resources may be preserved, while still permitting and users to identify relevant portions of the video data for processing.

In some examples, in addition to storing the video data in remote storage 141 and local storage 140, video management system 110 may further generate metadata that can be stored with video data 133 in local storage 140. The metadata may be associated with the source of the video, timestamps associated with the video, or some other information associated with the video. Additionally, the metadata may correspond to attributes identified in the frames of the video data, wherein the attributes may comprise objects of interest, movement of objects, or some other attribute associated with imaging in the video data. The attributes may be identified by an automated process or may be identified by a user monitoring video data 130 as it is obtained. Once the metadata is identified, the metadata may be stored alongside video data 133, permitting the user to identify relevant metadata with the various portions of the video data.

In some examples, although not demonstrated in operational scenario 300, at least a portion of video data 130 may be cached by video management system 110 in local storage 140 prior to forwarding the data to remote storage 141. The cached portion of video data 130 may correspond to the most recently imported video data, may correspond to video data associated with specific metadata, or may comprise some other portion of the original video data from video source 120. For example, if video management system 110 identified the movement of objects within the frame, metadata may be associated with video data 133 that indicates when the objects move in the frame. Additionally, at least a portion of video data 130 (or video data 132) can be cached in local storage 140 that corresponds to the movement of objects. In some examples, the caching of the data may occur prior to the data being stored in remote storage 141. In other examples, the caching of the data may occur concurrently with storing the data in remote storage 141.

Although demonstrated in the example of computing environment 100 of FIG. 1 using two storage locations, it should be understood that similar operations may be employed using any number of storage locations. Each of the storage locations may store a different format or quality of video or may correspond to a different latency or accessibility for the video data. For example, while a first and second location may store video data using the same format, the first storage location may only store a portion of the video data to provide quicker access (e.g., shorter latency) to the data over the second storage location.

Figure 4:
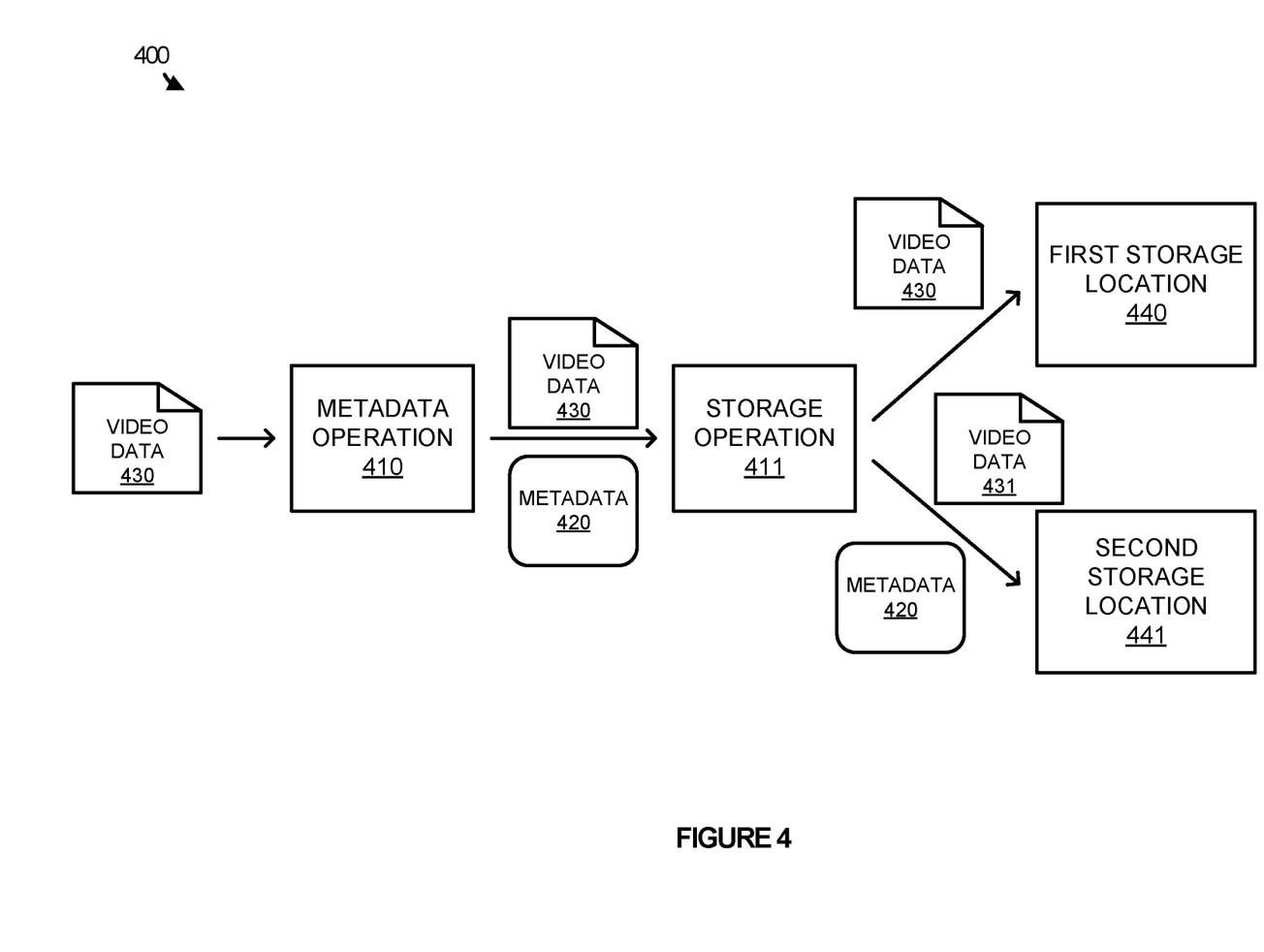
FIG. 4 illustrates an operational scenario of storing metadata associated with video data according to an implementation.

FIG. 4 illustrates an operational scenario 400 of storing metadata associated with video data according to an implementation. Operational scenario 400 includes video data 430, metadata 420, video data 431, first storage location 440, second storage location 441, and operations 410-411. Operations 410-411 are representative of operations that can be provided by a video management system, such as video management system 110 of FIG. 1.

In operation, a video management system ingests video data 430 from a video source. As the video data is ingested, the video management system implements metadata operation 410 to determine metadata 420 associated with the video data. The metadata may be determined based on information for the source of the video data (e.g., type of camera, location of the camera, timestamps, or some other metadata). In other implementations, metadata operation 410 may perform operations on the images within the video data. These operations may include identifying objects of interest, identifying the movement of objects, or performing some other operation. In some examples, the metadata may be detected automatically using image processing at the video management system, however, the metadata may be manually defined by one or more users associated with ingesting the video data.

As an illustrative example, a process on the video management system may determine when a person is identified within the images of video data 430. When a person is identified, metadata may be generated that indicates that a person was identified, timestamps of when the person was identified, and any other information associated with the identification of the person.

Once metadata 420 is generated, storage operation 411 is performed to store data in first storage location 440 and second storage location 441. In some examples, first storage location 440 may correspond to a location for higher quality video than second storage location 441, wherein video at first storage location 440 may comprise a higher frame rate, resolution, color configuration, or some other higher quality characteristic. In at least one implementation, first storage location 440 may correspond to a remote storage location, such as a server or datacenter accessible over the internet, while second storage location 441 may comprise a local storage location, such as a local server or computing system. Here, video data 430 is passed through from the video management system to first storage location 440, while video data 431 is stored at second storage location 441, wherein video data 431 comprises a downgraded version of video data 430.

In addition to storing video data 431 at second storage location 441, storage operation 411 further stores metadata 420 with the video data to provide context for the video data. In some implementations, a user may use the metadata to identify video portions of interest or to provide context for particular portions of the video data. For example, video data 431 may be stored with a lesser frame rate than video data 430. To identify video portions of interest, metadata may identify timestamps and attributes in the video data that might be interest to the user associated with the original video data. Using the lesser frame rate, the user may review the video data 431 to determine if additional frame rate is required to perform the desired operation. In particular, the user may select a range of time stamps associated with video data 431 and the video management system may obtain the required video data from first storage location 440. Advantageously, by storing the higher frame rate video in a separate storage location, resources may be preserved in the second storage location, while permitting the retrieval of data by an end user when required.

Figure 5:
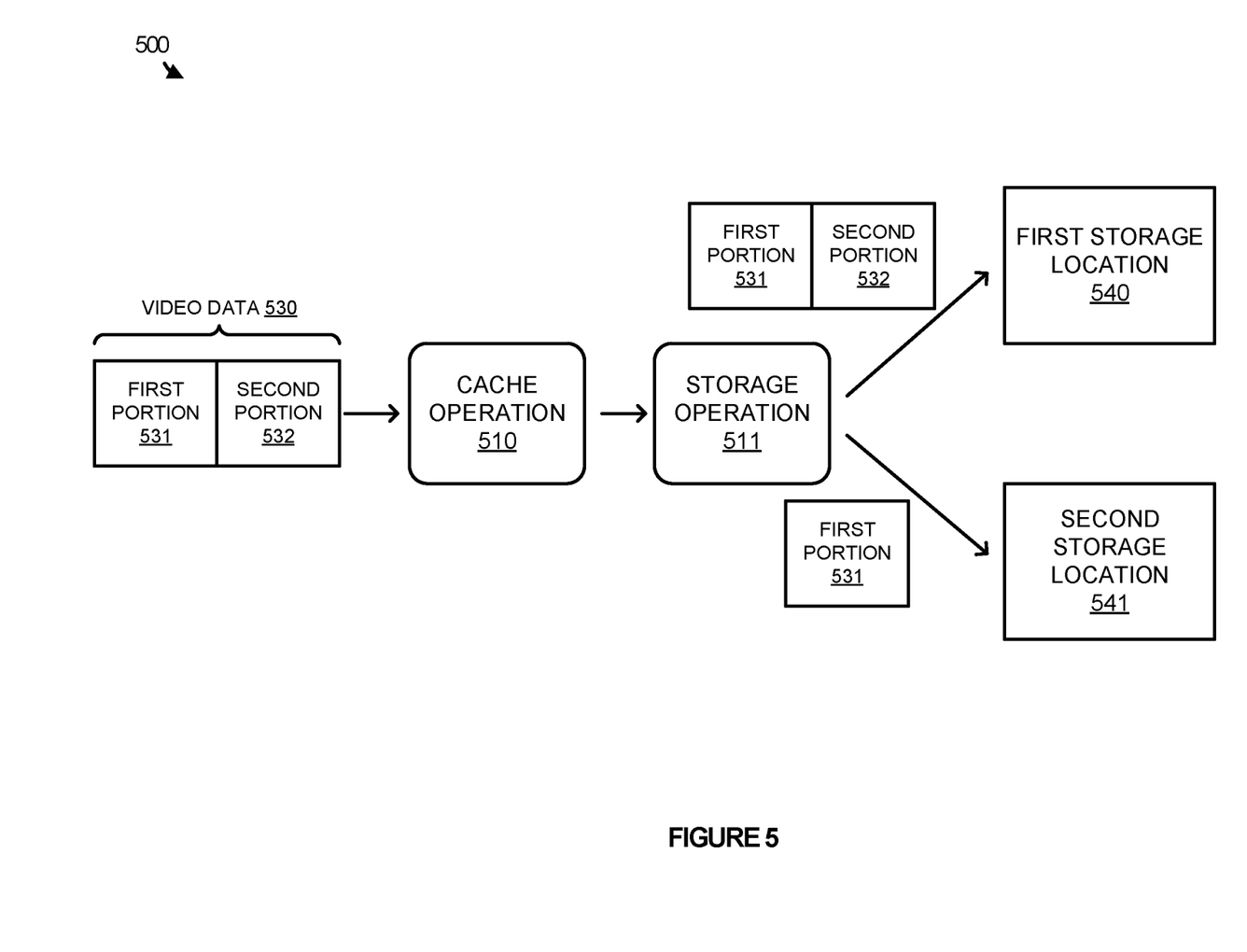
FIG. 5 illustrates an operational scenario of caching video data according to an implementation.

FIG. 5 illustrates an operational scenario 500 of caching video data according to an implementation. Operational scenario 500 includes video data 530 with portions 531-532, first storage location 540, second storage location 541, and operations 510-511. Operations 510-511 are representative of operations that can be employed by a storage management system, such as storage management system 110 of FIG. 1.

In operation video data 530 is obtained by a video management system from a camera or data storage device. In response to receiving the data, the video management system employs cache operation 510 that is used to identify video portions to be cached in second storage location 541. In some examples, second storage location 541 may represent a storage location that stores a lower quality video version of video data 530, such as a version with a lower resolution, frame rate, or some other video characteristic. Cache operation 510 may identify portions for caching based on the most recent video obtained from the video source, based on characteristics in the video data, such as metadata identified for the video data, or based on some other factor. For example, cache operation 510 may maintain a cache of the most recently obtained video data from the video sources. In another example, cache operation 510 may identify portions of the video data that correspond to particular traits identified within the video data, such as portions of the video data with movement.

Once the portions are identified, storage operation 511 stores portions of video data 530 in first storage location 540 and second storage location 541. Here, storage operation 511 caches first portion 531 in second storage location 541, while both first portion and second portion 532 are stored in first storage location 540. For example, if first portion 531 included attributes of interest, cache operation 510 may identify first portion 531 to be cached in second storage location 541. This portion may be stored in a format consistent with that of first storage location 540 or may comprise a different format that is better than the format used for second storage location 541. Thus, while second storage location 541 may store video data using a first format with a first frame rate, and first storage location 540 may store video data using a second format with a second format, the cached portion (first portion 531) may comprise a third format or may comprise the first format to match the first storage location.

After first portion 531 is cached, at least a portion of the video data may be replaced in the cache of second storage location 541. The replacement data may be based on time stamps (i.e., the most recent data), may be based on the type of metadata associated with the metadata, may be based on whether a user has recently requested the video data for processing, or may be based on some other factor. As an example, as additional video data is obtained from the video source, the video management system may remove the oldest video data that is cached in second storage location 541.

Figure 6:
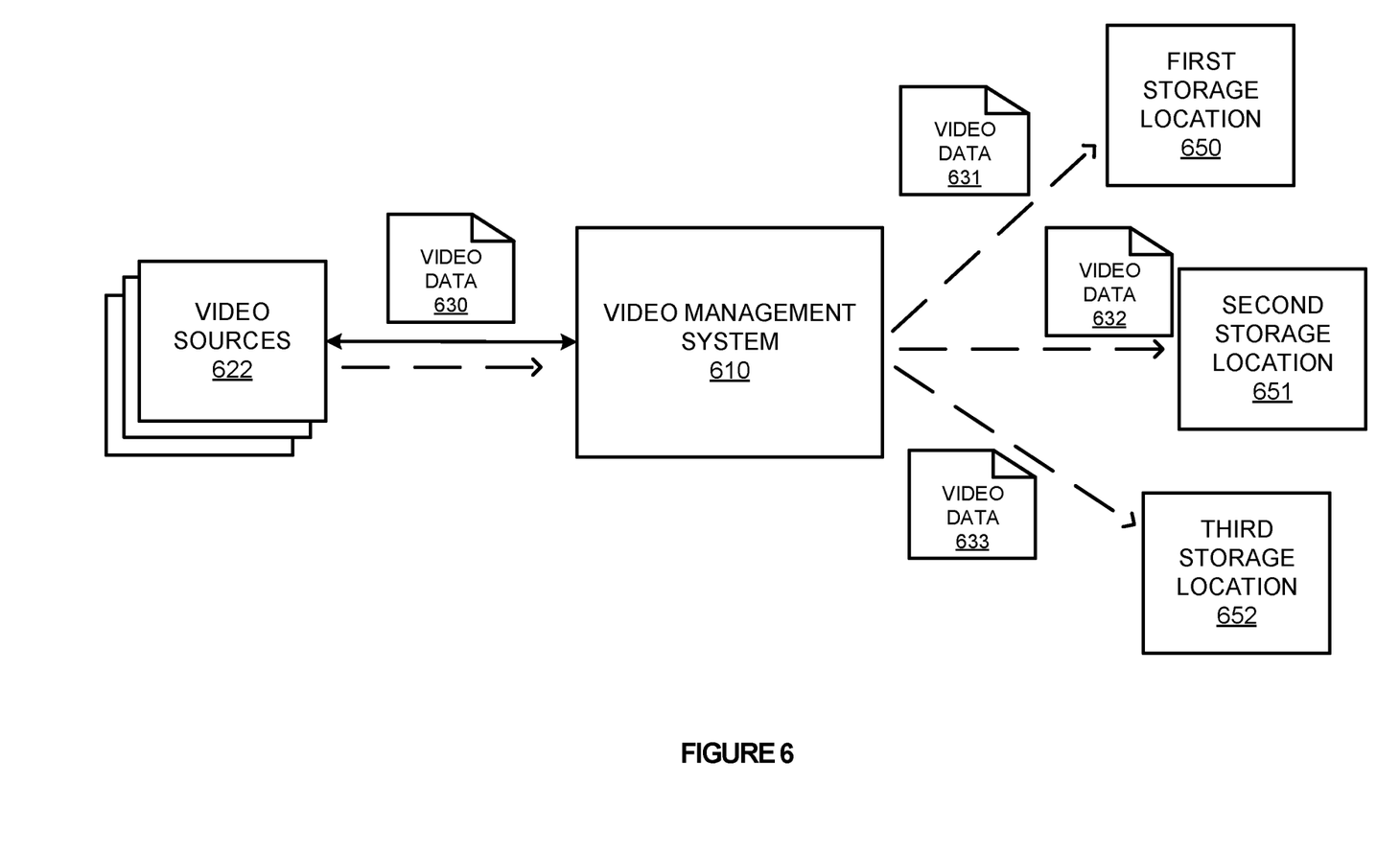
FIG. 6 illustrates an operational scenario of storing video data in multiple storage locations according to an implementation.

FIG. 6 illustrates an operational scenario 600 of storing video data in multiple storage locations according to an implementation. Operational scenario 600 includes video sources 622, video management system 610, video data 630-633, and storage locations 650-652. Video sources 622 are representative of camera or storage devices. Storage locations 650-652 are representative of a local storage device, such as a desktop computer or server on a local network, cloud storage devices, or some other storage device. For example, first storage location 650 may comprise a local storage location, second storage location 651 may comprise a fast retrieval server available over the internet, and third storage location 652 may comprise a slower data retrieval server available over the internet.

In operation, video sources 622 provide video data 630 to video management system 610. In response to obtaining the video data, video management system 610 processes the data and determines the format and storage location for the video data. Here, video data 631 is provided to first storage location 650, video data 632 is provided to second storage location 651, and video data 633 is provided to third storage location 634. In some implementations, in storing the data, each of the storage locations may be associated with a particular format. For example, the first storage location 650 may be associated with a first format, while the second and third storage locations 651-652 are associated with a second format.

Further, in some implementations, the storage locations may be associated with different data access times. Referring to the previous example, while storage locations 651-652 may store video data in the same format, the data access time to retrieve the data may be fast for second storage location 651 in relation to data storage location 652. As a result, second storage location 651 may be used as a cache that stores smaller amounts of the video data in relation to third storage location 652. Video management system 610 may determine what video is cached based on timestamps associated with the video data, based on metadata associated with the portions of video data, or based on some other factor. For example, video management system 610 may cache data in second storage location 651 video data that corresponds to the ten most recent hours of video processed by video management system 610. In some implementations, data may initially be stored in second storage location 651 prior to migrating the data to third storage location 652. In another implementation, the video may be stored in both second storage location 651 and third storage location 652 without migration from one storage location to another.

In some examples, when storage locations comprise remote storage locations or storage locations available over the network, video data may be provided to the storage locations as the video data is processed, at periodic intervals, at network down time, or at some other interval. For instance, video management system 610 may cache the video data for a period until the network is available to communicate the video data to the remote storage location.

In some implementations, video management system 610 may be responsible for determining where video data should be retrieved for a requesting user. For example, when storage locations 650 store data with different video qualities and/or different retrieval latency, video management system 610 may be responsible for identifying the appropriate storage location to support the request of a user. Thus, if the user were accessing video data in a first format from first storage location 650, but required a higher quality version of the video data, video management system 610 may determine which of storage locations 651-652 should be used to support the request based on the video quality and/or latency associated with the request for the data.

Figure 7:
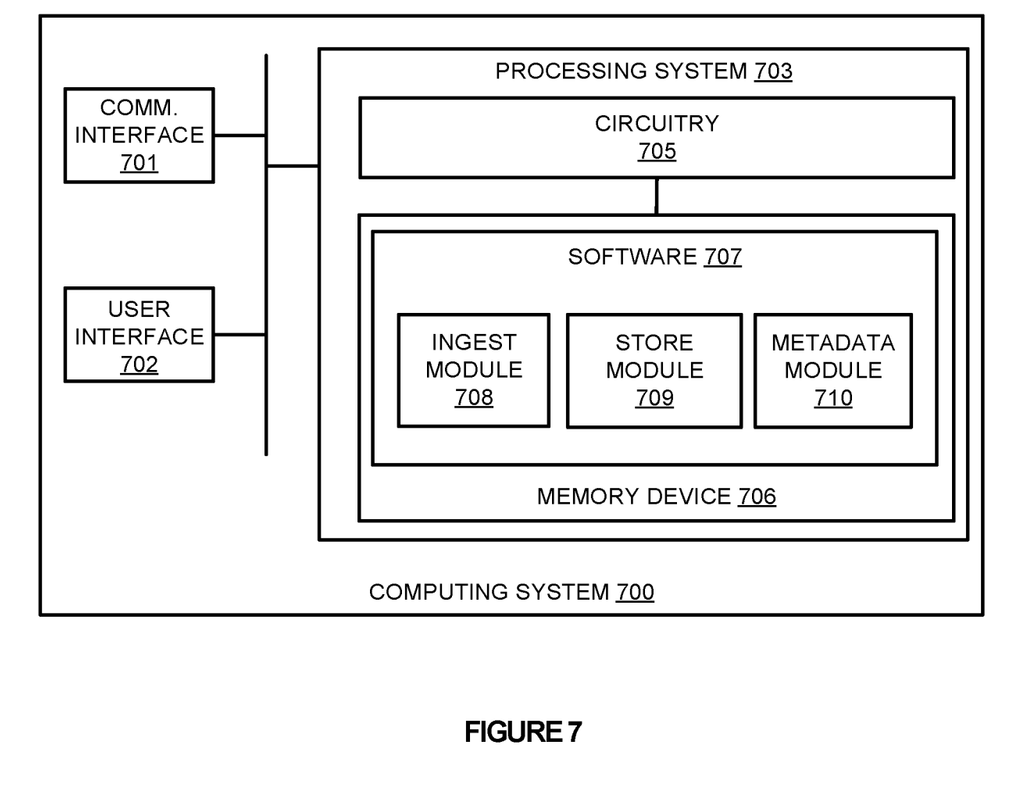
FIG. 7 illustrates a video management computing system according to an implementation.

FIG. 7 illustrates a video management computing system according to an implementation. Computing system 700 is representative of any computing system or systems with which the various operational architectures, processes, scenarios, and sequences disclosed herein for an object management system may be implemented. Computing system 700 is an example of object management system 110 of FIG. 1, although other examples may exist. Computing system 700 comprises communication interface 701, user interface 702, and processing system 703. Processing system 703 is linked to communication interface 701 and user interface 702. Processing system 703 includes processing circuitry 705 and memory device 706 that stores operating software 707. Computing system 700 may include other well-known components such as a battery and enclosure that are not shown for clarity.

Communication interface 701 comprises components that communicate over communication links, such as network cards, ports, radio frequency (RF), processing circuitry and software, or some other communication devices. Communication interface 701 may be configured to communicate over metallic, wireless, or optical links. Communication interface 701 may be configured to use Time Division Multiplex (TDM), Internet Protocol (IP), Ethernet, optical networking, wireless protocols, communication signaling, or some other communication format—including combinations thereof. In some implementations, communication interface 701 may be configured to communicate with one or more storage locations capable of storing video data in a variety of different formats. In some examples, communication interface 701 may communicate with a client device, wherein the client device may request video data from the various different storage locations.

User interface 702 comprises components that interact with a user to receive user inputs and to present media and/or information. User interface 702 may include a speaker, microphone, buttons, lights, display screen, touch screen, touch pad, scroll wheel, communication port, or some other user input/output apparatus—including combinations thereof. In some implementations, user interface 702 may permit a user to request and process various video data stored in multiple storage locations. User interface 702 may be omitted in some examples.

Processing circuitry 705 comprises microprocessor and other circuitry that retrieves and executes operating software 707 from memory device 706. Memory device 706 may include volatile and nonvolatile, removable and non-removable media implemented in any method or technology for storage of information, such as computer readable instructions, data structures, program modules, or other data. Memory device 706 may be implemented as a single storage device, but may also be implemented across multiple storage devices or sub-systems. Memory device 706 may comprise additional elements, such as a controller to read operating software 707. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing circuitry 705 is typically mounted on a circuit board that may also hold memory device 706 and portions of communication interface 701 and user interface 702. Operating software 707 comprises computer programs, firmware, or some other form of machine-readable program instructions. Operating software 707 includes ingest module 708, store module 709, and metadata module 710, although any number of software modules may provide the same operation. Operating software 707 may further include an operating system, utilities, drivers, network interfaces, applications, or some other type of software. When executed by processing circuitry 705, operating software 707 directs processing system 703 to operate computing system 700 as described herein.

In one implementation, ingest module 708 directs processing system 703 to ingest video data from one or more video sources, wherein the video sources comprise data storage devices or cameras. As the video is ingested, store module 709 directs processing system 703 to store the video data in multiple storage locations. In at least one example, store module 709 stores the video data in a first format in a first storage location and stores the video data in a second format in a second storage location. The different formats may correspond to different resolutions, different frame rates, different color configurations, different compression formats, or some other different format, including combinations thereof.

In at least one example, a first storage location may store the video data in a format with a lesser quality than a second storage location. The lesser quality may correspond to frame rate, resolution, color quality, or some other change to the quality of the video data. In some examples, the lesser quality format may be stored in a storage location with a faster access time than the greater quality format. For example, the video data may be stored in a first format in a local server for an end user, while the video data may be stored in a second format in another server that is available over the internet. In some instances, the remote storage may further be stored in different storage locations associated with different access times. Thus, a portion of the video data, e.g., the most recently ingested video data, may be cached in a first remote storage location with a first access time, and a larger portion (or all) of the video data may be stored in a second remote storage location with a second access time that is slower than the first access time.

In addition to storing the data, metadata module 710 directs processing system 703 to determine metadata associated with the ingested video data. In some examples, the metadata may correspond to attributes of the video source, such as camera manufacturer, location of the camera, timestamps, or some other similar metadata. In some implementations, the metadata module 710 may determine characteristics from the imaging in the video data. The characteristics may include objects of interest, movement of objects, or some other information about the video data images. Once the metadata is generated, the metadata may be stored alongside the video data in at least one of the storage locations. In some examples, the metadata may be stored along with the lower quality of video, such that a user can identify video segments of interest. Thus, if a lower quality version of video were stored on a local computer of an end user, the user may identify relevant portions of video using the metadata (e.g., time stamps and other information) and computing system 700 may obtain the relevant data from at least one of the storage repositories.

In some examples, computing system 700 may provide caching operations based on the most recently ingested video, based on the time stamps associated with the video, based on metadata attributes associated with the video, or based on some other factor. For instance, computing system 700 may cache the most recent four hours of video data in a first location. Additionally, computing system 700 may migrate the data to a second storage location or store another copy of the data in the second storage location. In this manner, computing system 700 may conserve storage resources at a first location by caching higher quality video and lower quality video data and storing higher quality video data at another location.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method comprising:
   obtaining video data from a video source;
   identifying metadata for the video data based on one or more characteristics identified in association with the video data, wherein the one or more characteristics comprise one or more objects of interest in the video data or movement associated with one or more objects of interest in the video data;
   storing the video data in a first format in a first storage location;
   storing one or more portions of the video data in a second format in a second storage location based on the metadata, wherein the second format comprises one or more lesser video quality characteristics than the first format, wherein the second storage location is storage on a computing system for a user or a server on a local network for the user, wherein the first storage location comprises storage in at least one server accessible over the internet by the user, and wherein the second storage location comprises a faster data access time than the first storage location; and
   storing at least a portion of the metadata with the video data in the second format in the second storage location.

2. The method of claim 1, wherein the one or more lesser video quality characteristics comprises resolution, frame rate, or color quality.

3. The method of claim 1, wherein the video source comprises a camera or a storage device.

4. The method of claim 1, wherein obtaining the video data from the video source comprises obtaining the video data from the video source in the first format.

5. The method of claim 1, wherein obtaining the video data from the video source comprises obtaining the video data from the video source in a third format.

6. The method of claim 1, wherein the second storage location is closer in physical proximity to the user than the first storage location.

7. The method of claim 1 further comprising storing at least a portion of the video data in a third format.

8. The method of claim 1 further comprising caching a portion of the video data in the first format in the second storage location.

9. A computing apparatus comprising:
   a storage system;
   a processing system operatively coupled to the storage system;
   program instructions stored on the storage system that, when executed by the processing system, direct the processing system to:
   obtain video data from a video source;
   identify metadata for the video data based on one or more characteristics identified in association with the video data, wherein the one or more characteristics comprise one or more objects of interest in the video data or movement associated with one or more objects of interest in the video data;
   store the video data in a first format in a first storage location;
   store one or more portions of the video data in a second format in a second storage location based on the metadata, wherein the second format comprises one or more lesser video quality characteristics than the first format, wherein the second storage location comprises a faster data access time in comparison to the first storage location, and wherein the first and second storage locations each comprise one or more servers; and
   store at least a portion of the metadata with the video data in the second format in the second storage location.

10. The computing apparatus of claim 9, wherein the one or more lesser video quality characteristics comprises resolution, frame rate, or color quality.

11. The computing apparatus of claim 9, wherein the video source comprises a camera or a storage device.

12. The computing apparatus of claim 9, wherein obtaining the video data from the video source comprises obtaining the video data from the video source in the first format.

13. The computing apparatus of claim 9, wherein obtaining the video data from the video source comprises obtaining the video data from the video source in a third format.

14. The computing apparatus of claim 9, wherein the second storage location is closer in physical proximity to the user than the first storage location.

15. The computing apparatus of claim 9, wherein the program instructions further direct the processing system to store at least a portion of the video data in a third format.

16. The computing apparatus of claim 9, wherein the program instructions further direct the processing system to store at least a portion of the video data in the first format in the second storage location.

17. A method comprising:
    obtaining video data from a video source;
    identifying metadata for the video data based at least on one or more characteristics identified in association with the video data, wherein the one or more characteristics comprise one or more objects of interest in the video data or movement associated with one or more objects of interest in the video data;
    storing the video data in a first format in a first storage location based on the metadata;
    storing at least a portion of the video data in one or more second formats in one or more second storage locations, wherein the first format comprises one or more different video quality characteristics than the one or more second formats, wherein the first storage location comprises a faster data access time in comparison to the one or more second storage locations, and wherein the first storage location and one or more second storage locations each comprise one or more servers; and
    storing at least a portion of the metadata with the video data in the first format in the first storage location.

18. The method of claim 17, wherein storing at least a portion of the video data in the one or more second formats in the one or more second storage locations comprises:

storing a first portion of the video data in a first format of the one or more second formats in a first storage location of the one or more second storage locations;

storing a second portion of the video data in a second format of the one or more second formats in a second storage location of the one or more second storage locations, wherein the first storage location of the one or more second storage locations comprises a faster data access time than the second storage location of the one or more second storage locations.

\* \* \* \* \*